United States Patent [19]

Biswas et al.

[11] 4,441,822

[45] Apr. 10, 1984

[54] APPARATUS FOR MIXING AND DISTRIBUTING SOLID PARTICULATE MATERIAL

[75] Inventors: Bimal K. Biswas, East Orange; Joseph E. Kochie, Carteret, both of N.J.

[73] Assignee: Foster Wheeler Energy Corporation, Livingston, N.J.

[21] Appl. No.: 376,644

[22] Filed: May 10, 1982

Related U.S. Application Data

[62] Division of Ser. No. 183,781, Sep. 3, 1980, abandoned.

[51] Int. Cl.³ .............................................. B01F 13/02
[52] U.S. Cl. .................................... 366/101; 34/57 A
[58] Field of Search ............... 366/101, 341, 106, 107, 366/9, 177, 183; 34/57 A; 406/138

[56] References Cited

U.S. PATENT DOCUMENTS

| | | | |
|---|---|---|---|
| 2,786,280 | 3/1957 | Gishler | 366/101 |
| 3,236,607 | 2/1966 | Porter | 34/57 A |
| 4,203,689 | 5/1980 | Kraxner | 406/138 |

*Primary Examiner*—Robert W. Jenkins
*Attorney, Agent, or Firm*—Marvin A. Naigur; John E. Wilson; Warren B. Kice

[57] ABSTRACT

An apparatus for mixing and distributing solid material in which the material is continuously introduced into a vessel and a pressurized gas is introduced into the lower portion of the vessel at a velocity sufficient to pass upwardly through the material in the vessel to promote mixing of the material. A plurality of outlets are disposed in an angularly spaced relation along the vessel for permitting the material to continuously discharge to a plurality of selected locations.

18 Claims, 5 Drawing Figures

4,441,822

APPARATUS FOR MIXING AND DISTRIBUTING SOLID PARTICULATE MATERIAL

This is a division of application Ser. No. 183,781, filed Sept. 3, 1980, now abandoned.

BACKGROUND OF THE INVENTION

This invention relates to a mixing and distributing apparatus, and more particularly to such an apparatus for receiving one or more materials which are mixed and distributed from a plurality of spaced outlets.

The use of fluidized beds has long been recognized as an attractive way of generating heat. In these type of arrangements, a particulate material, including a mixture of fuel material, such as coal, and an adsorbent material for the sulfur released as a result of the combustion of the fuel material, are disposed on a grate or grate-like plate. Air is passed through the bed to fluidize the material so that the bed behaves as a boiling liquid which promotes the combustion of the fuel.

Additional fuel and adsorbent material must be continuously supplied to the bed through a plurality of overbed or inbed feeders disposed at spaced locations along the walls of the vessel housing the fluidized bed. Since in many arrangements a plurality of material inlets are provided through two or more walls of the vessel, it becomes difficult from a materials handling standpoint to receive the fuel materials and the adsorbent materials from separate sources, mix them and uniformly distribute them to the selected locations along the walls of the vessel.

SUMMARY OF THE INVENTION

It is therefore an object of the present invention to provide an apparatus for mixing and distributing solid particulate material from separate sources to a plurality of distribution points in a precise and uniform manner.

It is a further object of the present invention to provide a apparatus of the above type in which a stream of air is passed through a bed of particulate material to insure a uniform mixture of the material before it is distributed to multiple outlets.

Toward the fulfillment of these and other objects, the system of the present invention comprises a vessel for supporting a bed of particulate material and having inlet means for receiving additional material. A pressurized gas is introduced into the lower portion of the vessel at a velocity sufficient to pass upwardly through the material in the vessel and cause spouting to induce a flow of the material within the vessel to promote mixing and permit uniform distribution to multiple outlets.

DESCRIPTION OF THE PREFERRED EMBODIMENTS

Figure 1:
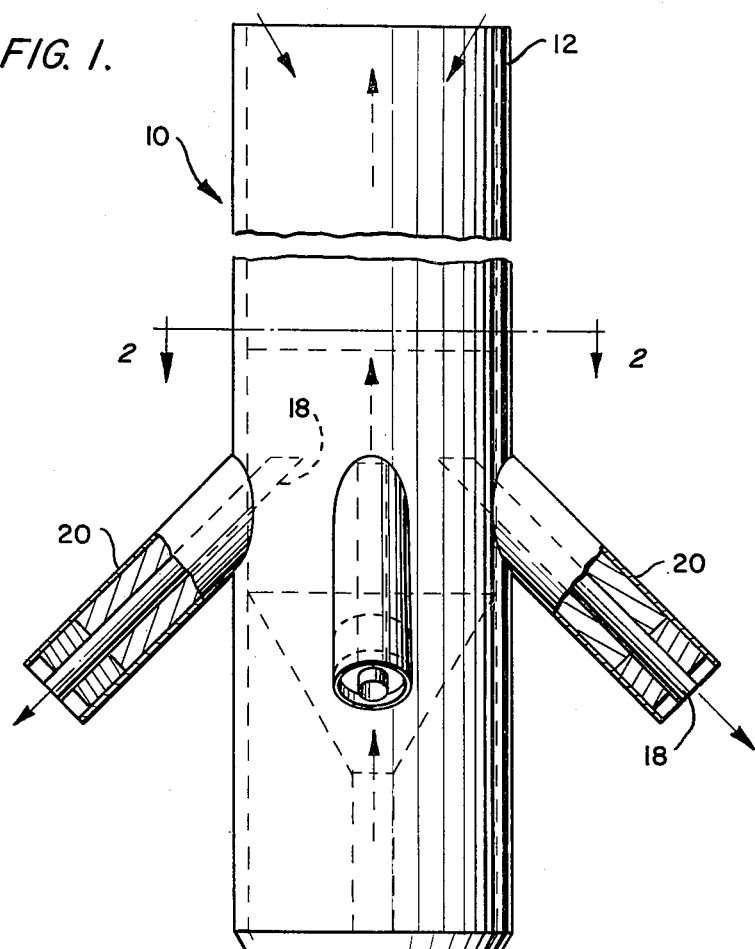
FIG. 1 is a front elevational view of the solid particulate material mixing and distributing apparatus of the present invention.
Figure 2:
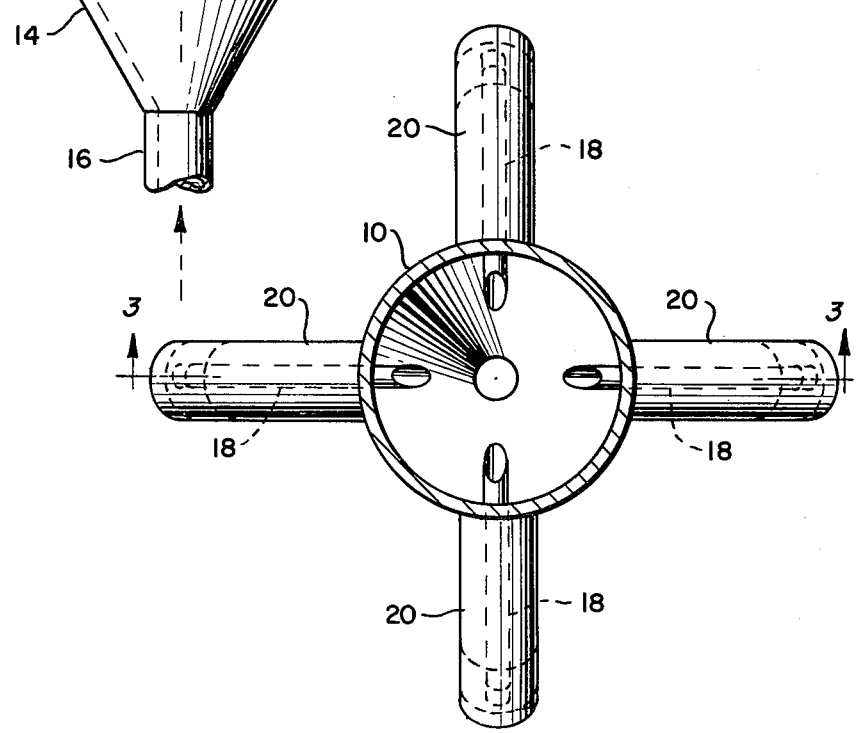
FIG. 2 is a cross-sectional taken along the line 2—2 of FIG. 1.

Referring specifically to FIGS. 1 and 2 of the drawings, the reference numeral 10 refers in general to an elongated cylindrical vessel having an open upper end 12 which is adapted to receive particulate material from one or more sources (not shown) which, for the purpose of example, can be a source of crushed coal for a fluidized bed and a source of limestone for adsorbing the sulfur formed as a result of combustion of the coal. The lower end portion of the vessel 10 is formed into a conically shaped hopper 14 which has an inlet 16 registering with the smaller diameter thereof for receiving a pressurized gas, such as air, from an external source, which air passes upwardly through the vessel in the direction shown by the dashed lines.

Four equiangularly spaced outlet pipes 18 extend from a point within the vessel 10, through the vessel wall and to a point external of the vessel. The pipes 18 extend at an acute angle with respect to a horizontal plane and are covered by a refractory material 20.

Figure 3:
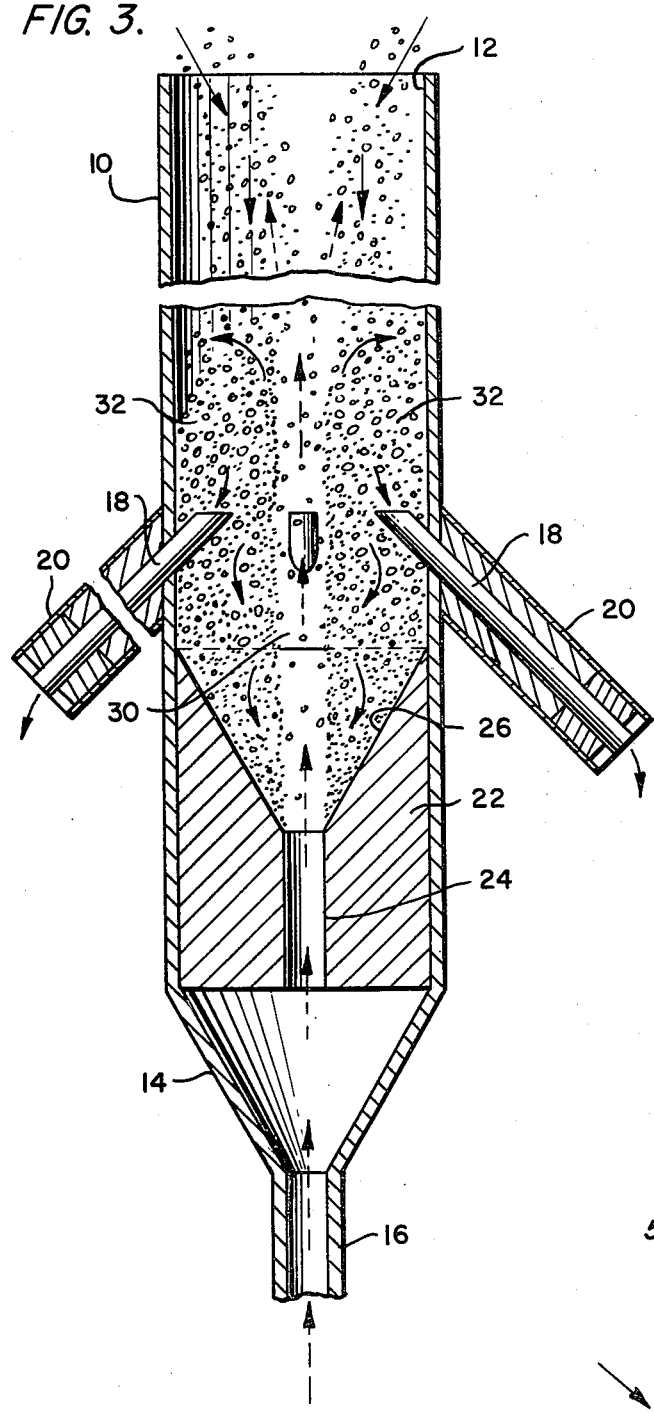
FIG. 3 is a vertical cross-sectional view taken along the line 3—3 of FIG. 2.

As shown in FIG. 3, a filler plug 22 is provided in the vessel immediately above the hopper 14 and has a central bore 24 through which the air from the inlet 16 passes, which bore widens out into a substantially conical shaped opening 26 which receives the material flowing downwardly in the vessel.

In operation, the material from two separate sources mentioned above is introduced into the upper end 12 of the vessel 10 and flows downwardly through the vessel by gravity before accumulating in the vessel. Air is introduced into the inlet 16 and passes through the hopper 14, through the cylindrical passage 24 of the filler plug 22 and upwardly through the material accumulating in the vessel 10. The velocity and flow of the air are regulated so that "spouting" occurs, i.e., a portion of the materials from the bed in the vessel will be discharged upwardly from the upper surface of the bed. As a result of this flow of the air through the material, a central zone, shown in general by the reference numeral 30, is formed which is concentric with the axis of the vessel and in which the concentration of the particles is low and the general movement of the particles is upward. An annular zone 32 is also formed which extends around the central zone 30 and in which the concentration of the particles is high and the general movement is downward. The central zone 30 is continually supplied with particles from the annular zone 30 in the vicinity of the opening 26, which particles are thus transported to the upper part of the bed by means of the pressurized air and then fall back down into the annular zone 32 and repeat the cycle. As a result, a thorough mixing of the particles within the bed is achieved.

During movement of the particles in the annular zone downwardly, a portion will enter the upper end of the discharge pipes 18 and be transported, by gravity, through the entire length of the pipes to areas external of the vessel 10. In the present embodiment in which four such pipes 18 are provided, it can be appreciated that a precise distribution of the mixed particles into four separate locations is thus achieved. In the case of a fluidized bed discussed above, a ducting system, or the like, can be provided to connect the outlet ends of the pipes 18 to the feeders associated with the walls of the vessel housing the fluidized bed.

Of course, the supply of new particulate material to the upper end portion 12 of the vessel 10 is regulated according to the discharge from the pipes 18 so that a continuous replenishing of the particle material in the vessel 10 is achieved.

Figure 5:
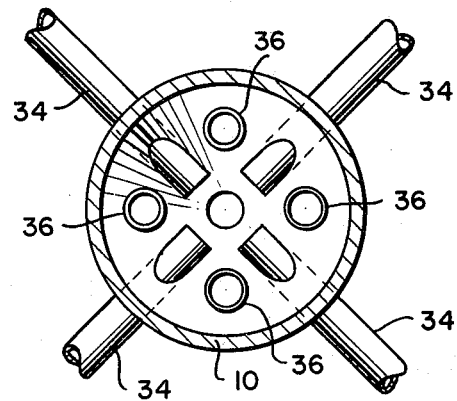
FIG. 5 is a horizontal cross-sectional view taken along the line 5—5 of FIG. 4.
Figure 4:
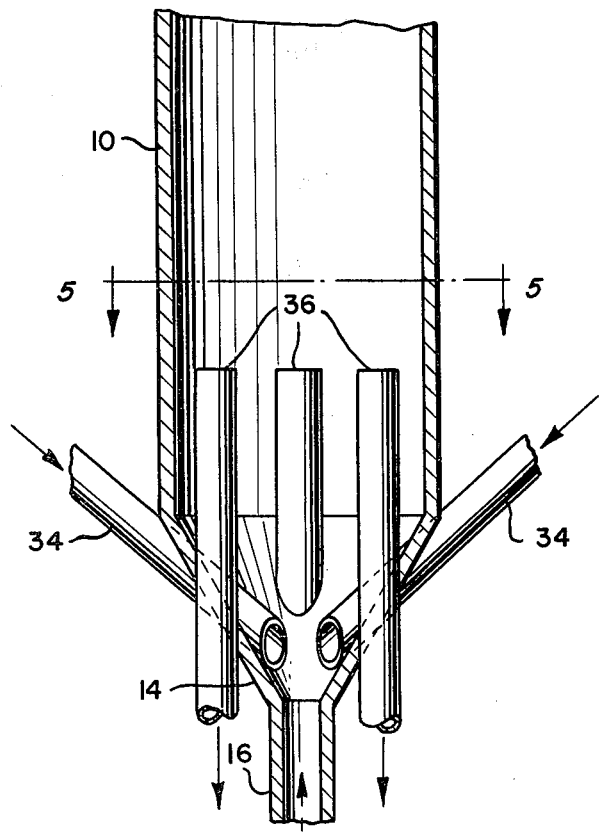
FIG. 4 is a view similar to FIG. 3 but depicting an alternate embodiment of the apparatus of the present invention.

The embodiment of FIGS. 4 and 5 is similar to that of FIG. 1-3 and includes identical components which are given the same reference numerals, with the particulate materials being omitted from the drawings in the interest of clarity. In this embodiment, the filler plug 22 of the previous embodiment is omitted and four equiangularly spaced inlet pipes 34 are provided which extend through the wall of the hopper portion 14 of the vessel and at an angle to the horizontal. The pipes 34 receive the particulate material from one or more sources as in the previous embodiment and feed the material into the lower portion of the hopper 14 immediately above the air inlet 16.

A central zone and an annular zone are thus formed and the flow pattern of the material in the vessel is the same as that discussed in connection with the previous embodiment.

Four vertically extending, angularly spaced, discharge pipes 36 extend from a point inside the vessel 10, and through the inclined walls of the hopper 14 for discharging the particulate material to four separate external locations in a manner similar to that in connection with the embodiments of FIGS. 1-3.

It is thus seen that, as a result of the foregoing, a precise mixing and distribution of the particulate material from one or more sources to a plurality of discharge points is achieved in a relatively simple and efficient manner.

As will be apparent to those skilled in the art, various changes and modifications may be made to the apparatus of the present invention without departing from the spirit and scope of the present invention as recited in the appended claims and their legal equivalent.

What is claimed is:

1. An apparatus for mixing and distributing solid particulate material, said apparatus comprising a vessel, a plurality of spaced inlet pipes extending through said vessel at an angle relative to the axis of said vessel and communicating with the lower portion of said vessel for introducing particulate material into said vessel to form a bed of material, means for introducing a pressurized gas into the lower portion of said vessel at a velocity sufficient to pass upwardly through said bed of material, means formed in the upper portion of said vessel for permitting said gas to discharge from said vessel, said gas passing through a central portion of said bed creating a central zone in which the concentration of particles in the gas is relatively low and said particles move upwardly with the gas, and an outer zone surrounding said central zone in which the concentration of said particles is relatively high and their general movement is downwardly, and a plurality of pipes communicating with corresponding portions of said outer zone in a common plane and extending from said outer zone, through said vessel and to an area external of said vessel, said pipes disposed in a spaced relation around said vessel and parallel to the axis of said vessel with their inlet ends extending above the discharge ends of said inlet pipes for permitting said material to discharge from a plurality of areas of said bed.

2. The apparatus of claim 1 wherein said vessel has a generally cylindrical shape and wherein said inlet pipes extend through circumferentially spaced openings extending through the wall of said vessel.

3. The apparatus of claim 1 wherein the inlet ends of each of said inlet pipes is disposed externally of said vessel and the discharge end of each inlet pipe extends below said inlet end and in the interior of said vessel.

4. The apparatus of claim 1 or 3 wherein the discharge end of each inlet pipe extends between said gas introducing means and said plurality of areas.

5. The apparatus of claim 1 wherein said gas passes through said bed at a velocity sufficient to cause a spouting of said particles from the upper surface of said bed.

6. The apparatus of claim 1 wherein said vessel has a generally cylindrical shape and wherein said outlet pipes extend through circumferentially spaced openings extending through the wall of said vessel.

7. The apparatus of claim 2 further comprising means disposed in said vessel for defining a conical hopper portion in said vessel, said gas introducing means registering with the apex of said hopper portion.

8. The apparatus of claim 7 wherein said inlet and outlet pipes extend through said hopper portion.

9. An apparatus for mixing and distributing solid particulate material, said apparatus comprising a vessel, means disposed in said vessel for defining a conical hopper portion in said vessel, inlet means extending through said hopper portion for introducing a particulate material into said vessel to form a bed of said material, means registering with the apex of said hopper portion for introducing a pressurized gas into the lower portion of said vessel at a velocity sufficient to pass upwardly through said bed of material, means formed in the upper portion of said vessel for permitting said gas to discharge from said vessel, a plurality of outlet pipes disposed in a spaced relation around said vessel and extending through said hopper portion and parallel to the axis of said vessel for permitting said material to discharge from a plurality of areas of said bed, said gas introducing means registering with the apex of said hopper portion and said inlet and outlet pipes extending through said hopper portion.

10. The apparatus of claim 9 wherein said gas passes through said bed at a velocity sufficient to cause a spouting of said particles from the upper surface of said bed.

11. The apparatus of claim 9 wherein said gas passes through a central portion of said bed creating a central zone in which the concentration of particles in the gas is relatively low and said particles move upwardly with the gas, and an outer zone surrounding said central zone in which the concentration of said particles is relatively high and their general movement is downwardly.

12. The apparatus of claim 11 wherein said outlet pipes communicate with corresponding portions of said outer zone in a common plane.

13. The apparatus of claim 12 wherein each of said outlet pipes extends from said outer zone, through said vessel and to an area external of said vessel.

14. The apparatus of claim 13 wherein said vessel has a generally cylindrical shape and wherein said outlet pipes extend through circumferentially spaced openings extending through said vessel.

15. The apparatus of claim 9 wherein the inlet means for said material is located in the lower portion of said vessel.

16. The apparatus of claim 9 wherein the inlet means for said material is in the form of a plurality of spaced pipes extending through said vessel with their discharge ends extending between said gas introducing means and said plurality of areas.

17. The apparatus of claim 16 wherein said vessel has a generally cylindrical shape and wherein said inlet pipes extend through circumferentially spaced openings extending through said vessel.

18. The apparatus of claim 16 wherein the inlet ends of each of said inlet pipes is disposed externally of said vessel and the discharge end of each inlet pipe extends below said inlet end and in the interior of said vessel.

* * * * *